April 10, 1928.

F. S. KINGSTON

INDUCTION MOTOR

Filed April 28, 1927

Inventor

F. S. KINGSTON

By Fisher, Moser & Moore
Attorneys

Patented Apr. 10, 1928.

1,665,742

UNITED STATES PATENT OFFICE.

FREDERICK S. KINGSTON, OF WARREN, OHIO, ASSIGNOR TO THE SUNLIGHT ELECTRICAL MANUFACTURING COMPANY, OF WARREN, OHIO, A CORPORATION OF OHIO.

INDUCTION MOTOR.

Application filed April 28, 1927. Serial No. 187,151.

The present invention relates to an improvement in electric motors, and more particularly in single phase induction motors, such for example as employ the so-called split phase method of starting, and wherein the starting winding is adapted to be cut out automatically after the motor gets up speed. In such motors the starting or auxiliary winding is commonly cut out by an automatic centrifugal device mounted on the shaft of the motor, and the starting torque is small and the starting current correspondingly large. Hence when a motor of that type is used for operating household appliances, for example, a washing machine, or refrigerating apparatus adapted to operate intermittently, etc., the starting of the motor, or overloading, imposes a heavy drain on the source of supply, and as the supply line is or forms part of the illuminating circuit for the residence, the lights are dimmed temporarily, a fuse may blow out, or the starting winding itself may burn out. The object of the present invention is to obviate the objectionable results referred to by providing electrically controlled clutch means adapted to increase the starting torque and effect starting with a minimum amount of starting current. This clutch is preferably of a kind or type normally connecting the motor armature operatively with the load but adapted to be operated electrically preferably by the current flowing through the starter windings. A preferred embodiment of the invention employs a magnetically-operated clutch of the proposed character that is connected electrically in series with either the main or auxiliary windings, or with both windings.

The solenoid winding of the clutch may also function as a resistance or reactance to effect the required time phase displacement of the current in the starting winding relative to the main winding in this type of motor. When the solenoid winding of the clutch is connected into the circuit of the starting winding, it will be cut out automatically when the motor has reached its operating speed, and be cut in automatically to relieve the motor temporarily when overloaded and slowed down to a speed where the centrifugal switch acts centripetally. The solenoid may also be connected electrically with the stator windings in several ways to control the clutching action and effect slip under varying operating conditions where such is desirable.

Figure 1:
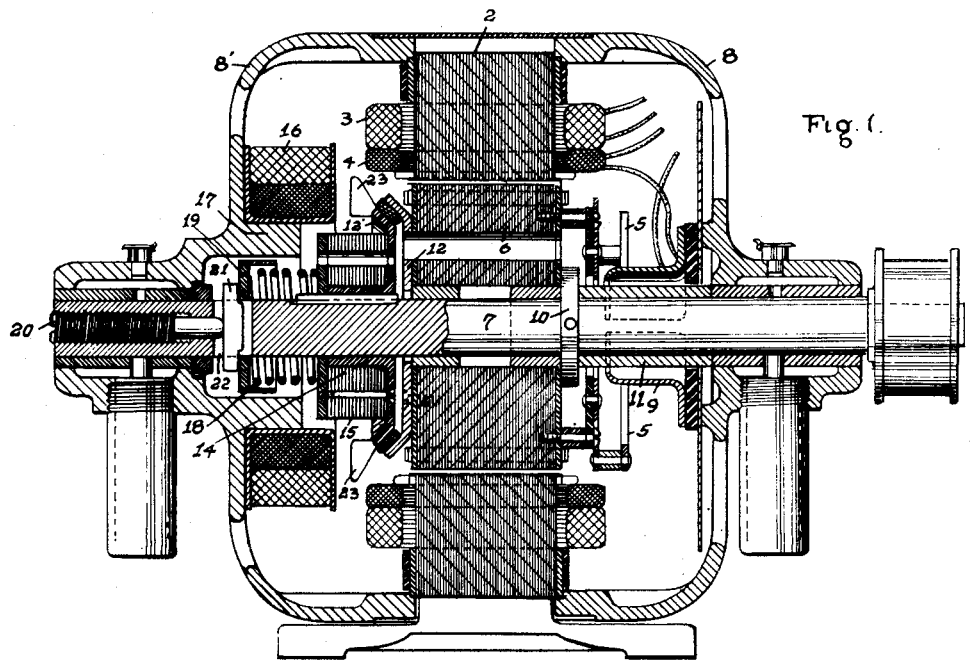

In the accompanying drawing, Fig. 1 is a section view of a split phase induction motor embodying the invention. Figs. 2, 3, 4, and 5, are diagrams, showing several different split-phase circuit arrangements involving the invention.

In a preferred embodiment of the invention the motor may be made as customarily with a stator 2 having two sets of windings or coils 3 and 4, respectively, the terminals of which are connected to the circuit source to permit the current to pass through the stator windings by two paths arranged in parallel, one having more inductance or capacity than the other. The circuit for the auxiliary or starting winding 4 comprises a set of centrifugal switch elements 5 which are jointly supported upon one side of the armature or rotor 6, which rotor may be a squirrel cage or wound rotor mounted to revolve freely on motor shaft 7. The opposite ends of shaft 7 have rotatable bearing in the hub portions of the end hoods 8—8' of the motor, and the centrifugal switch elements 5 coact with a split cup or conducting ring 9 supported in a stationary position within one end hood 8, whereby when the rotor has reached its operating speed the starting winding 4 is cut out by the centrifugal movement of the switch contact elements 5.

One side of rotor 6 bears against a thrust collar 10 on shaft 7 and this collar in turn bears against one end of a spacing collar 11 extending through cup 9. A clutch member 12 is secured to the opposite side of rotor 6 in clutch-engaging position opposite a second coacting clutch member 12' keyed in slidable connection with shaft 7. A cone clutch is shown in the present instance, but a disk clutch or any suitable type of clutch may be used instead. The slidable clutch member 12' comprises a cylindrical hub or elongated extension 14 which may be solid or in part composed of laminations and adapted to act as the movable part or core 15 of a solenoid 16 comprising one or more coils connected in series with one or both of the stator windings 3 and 4, as hereinafter more specifically described. Solenoid 16 is supported in any suitable manner in a stationary position upon or within end hood 8' opposite the movable core or armature 15. For example, solenoid 16 may be mounted upon an inwardly-extending hollow hub part 17 of hood 8', and the end of core 15 may be spaced apart therefrom to permit the core to be drawn outwardly to disengage the clutch members when the solenoid is energized. A coiled spring 18 is sleeved upon shaft 7 within hollow hub 17, which spring presses against core 15 and effects clutching of the two clutch members when the solenoid is deenergized. The tension of spring 18 may be changed by shifting its backing collar 19 on shaft 7, using any suitable adjusting means for that purpose, say an adjusting screw 20 within one end of the shaft itself together with a bar or pin 21 engaged at its opposite ends with collar 19 and loosely confined within a transverse slot 22 in the shaft where the inner end of screw 20 may press against its middle. Fan blades 23 may also be affixed to one of the rotatable parts within the motor housing to circulate the air and cool the same, and in the present instance a set of these fan blades are affixed to slidable clutch member 12' intermediate the friction flange of member 12 and solenoid 16. The friction surfaces of the clutch members may be made of metal, lined with friction material, or otherwise constructed to permit proper clutching results, it being understood that whatever clutch is used, the release thereof is under electrical control during the passage of the electric current through the starting winding.

Figure 2:
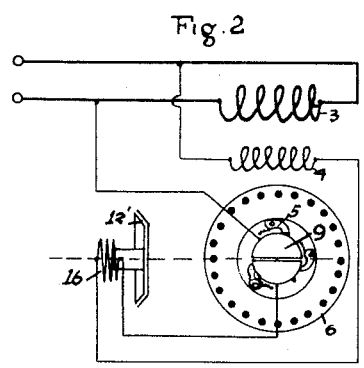

In Fig. 2 I show a diagram of one circuit arrangement for an electrical clutch for a motor of this kind, the main winding 3 being connected across the line and starting winding 4 being connected in series with the centrifugal switch elements 5 and solenoid 16. When the motor is switched on the current passes through both the main and starting windings, and solenoid 16 is instantly energized, thereby throwing the clutch out and permitting rotor 6 to revolve freely on motor shaft 7. This rotor comes quickly up to speed and in so doing the centrifugal contact or switch elements 5 cut out starting winding 4 and solenoid 16, thus permitting spring 18 to throw the clutch members into engagement and pick up the load while the rotor is up to speed.

Figure 3:
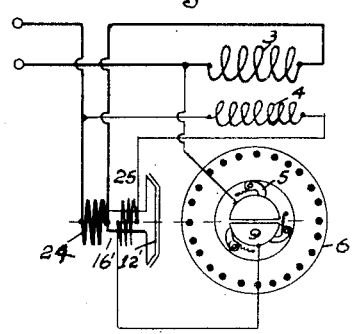

Fig. 3 illustrates a modified circuit, comprising a solenoid 16' having a double winding, one winding or coil 24 being connected in series with the main winding 3 of the stator, and the other winding or coil 25 being connected in series with the starting winding 4 and the centrifugal switch conductors 9. In this case when the motor is up to full speed and no load is carried a slight pull may be produced on core 15 and then, as a load is placed on the motor, the main winding will draw more current tending to increase the pull on core 15 so that the clutch members will slip when a predetermined overload is placed on the motor.

Figure 4:
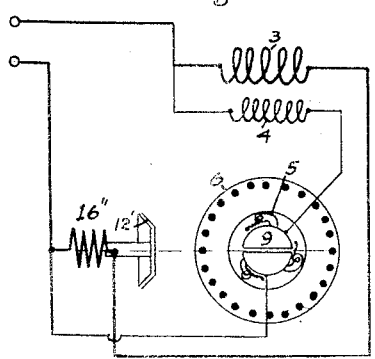
Figure 5:
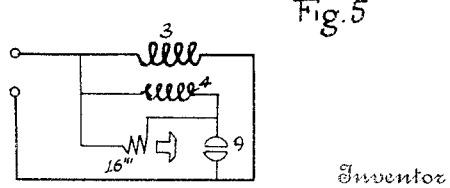

Fig. 4 shows a motor circuit in which a clutch controlling solenoid 16'' is connected in series with the main winding 3, and the starting winding 4 is connected with the switching device 9. Here the inrush current is sufficient to pull core 15 against spring 18 to hold the clutch open until the operating motor reaches a desired speed. A heavy spring may be used if desired and the solenoid wound so that slipping of the clutch is effected when the motor is overloaded and caused to draw a large amount of electric current. In each of the above diagrammatic illustrations of the electrical and magnetic relations of the motor elements, the winding of the clutch-operating solenoid is utilized as a phase-displacing impedance in association with the starting winding. A further modification of the invention is shown in Fig. 5, and in this case the starting winding 4 and a clutch-controlling solenoid 16''' are in parallel and connected with the phase splitter or centrifugal switch cup 9.

What I claim is:

1. An induction motor, having a starting winding, an electro-magnetic clutch having an energizing winding, and means responsive to the motor speed for de-energizing both of said windings after the motor has been started.

2. A split phase induction motor, including a starting winding, means adapted to cut out said winding automatically after the motor is started, and a magnetic clutch having a coil in circuit with said starting winding and serving as a reactance therefor.

3. A split phase induction motor, including a starting winding, centrifugal switching means for said winding, a motor shaft, a rotor free to revolve on said shaft, and a magnetic clutch for said rotor and shaft electrically connected with said starting winding and switching means.

4. A split phase induction motor, including a split phase starting circuit and automatic cut-out means therefor, a spring pressed rotor clutch, and a solenoid in said circuit adapted to throw out said clutch in starting operations.

5. An induction motor having split phase starting devices, including automatic switching means for said devices, a normally engaged clutch for the rotor and rotor shaft, and electro-magnetic means associated with said switching means and adapted to be energized to disengage said clutch in starting operations and to be deenergized when the motor is running normally.

6. An induction motor, comprising a stator having a main winding and a starting winding, a rotor having centrifugal switching means connected in series with said starting winding, a power-transmitting shaft having the rotor free to rotate thereon, a clutch member slidably keyed to said shaft, a spring adapted to press said member in friction contact with said rotor, and a solenoid in circuit with one of said windings adapted to throw out said clutch member when said winding is energized.

7. A split phase induction motor, including a starting winding, a motor shaft, a rotor free to revolve on said shaft, a clutch member for said rotor, a pressure-applying spring for said clutch member, a solenoid in circuit with said starting winding adapted to throw out said clutch in opposition to said spring, and means adapted to automatically energize said solenoid for an interval in operating the motor.

8. An induction motor, comprising a stator having main and starting windings, a rotor mounted to rotate freely on a shaft, a magnetic clutch for said rotor and shaft connected in series with the starting winding, automatic switching means adapted to cut out said starting winding and de-energize said magnetic clutch after starting the rotor, and spring-pressed means adapted to throw in the de-energized clutch and effect a friction clutch connection for the shaft during normal running of the motor.

9. An induction motor, comprising a stator having separate sets of main and starting windings, a motor shaft and end hoods connected with said stator having bearings for said shaft, a rotor free to rotate on said shaft, a friction clutch connecting said rotor and shaft, a solenoid for throwing out said clutch mounted within one end hood, and automatic switching devices within the other end hood connected in circuit with both the starting winding and said solenoid to disconnect the clutch and cut out the starting winding jointly in starting operations.

10. An induction motor, comprising a stator having main and starting windings, a motor shaft having a rotor free to revolve thereon, a clutch and spring sleeved on said shaft for said rotor, electro-magnetic means in circuit with one of said windings adapted to disengage said clutch from said rotor, and a movable backing for said spring having an adjusting screw axially of said shaft and exposed at one end thereof.

11. An induction motor, comprising a stator having windings, a power shaft, bearing for said shaft, a rotor free to revolve on said shaft, a clutch member for said shaft, a clutch member for said rotor slidably keyed to said shaft, a spring sleeved on said shaft, electro-magnetic means in circuit with said windings to disconnect said clutch member, a pressure-applying element for said spring extending transversely through said shaft, and a set screw extending axially of said shaft in engagement with said element.

12. An induction motor, comprising a stator, end hoods for said stator, a motor shaft having bearing in said hoods, a rotor free to revolve on said shaft, a friction clutch on said shaft for said rotor, one of said hoods having a cylindrical extension projecting inwardly around said shaft, a solenoid mounted upon said extension, and a movable core affixed to said friction clutch and extending into said solenoid, said solenoid when energized being adapted to disengage the clutch.

13. An induction motor, including a stator having a starting winding and a main winding, a rotor and a driven element, clutch means operating normally to connect the rotor with the driven element, and electro-magnetic means responsive to the degree of energization of one of said windings for actuating said clutch means to release the rotor from the driven element.

14. In a split-phase induction motor, a stator having a main winding and a starting winding, a rotor, a driven member, a clutch for operatively connecting the rotor to the driven member, electro-magnetic means including a winding for controlling the operation of said clutch, said starting winding being connected in series relation with the winding of said electro-magnetic means whereby the impedance of said last named winding is utilized to materially increase the impedance of the starting winding.

In testimony whereof I affix my signature.

FREDERICK S. KINGSTON.